(12) United States Patent
Luo et al.

(10) Patent No.: US 11,525,770 B2
(45) Date of Patent: Dec. 13, 2022

(54) PROCESS AND SYSTEM FOR SIZING TWO-DIMENSIONAL NANOSTRUCTURES

(71) Applicants: CLEVELAND STATE UNIVERSITY, Cleveland, OH (US); CASE WESTERN RESERVE UNIVERSITY, Cleveland, OH (US)

(72) Inventors: Qinmo Luo, Shaker Heights, OH (US); Emily B. Pentzer, Cleveland, OH (US); Christopher L. Wirth, Lakewood, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 135 days.

(21) Appl. No.: 16/898,912

(22) Filed: Jun. 11, 2020

(65) Prior Publication Data

US 2020/0393364 A1 Dec. 17, 2020

Related U.S. Application Data

(60) Provisional application No. 62/859,821, filed on Jun. 11, 2019.

(51) Int. Cl.
| | |
|---|---|
| *G01N 21/25* | (2006.01) |
| *G01N 21/90* | (2006.01) |
| *C01B 32/182* | (2017.01) |
| *G01N 21/84* | (2006.01) |
| *B82Y 35/00* | (2011.01) |

(52) U.S. Cl.
CPC ......... *G01N 21/255* (2013.01); *C01B 32/182* (2017.08); *G01N 21/90* (2013.01); *B82Y 35/00* (2013.01); *C01B 2204/32* (2013.01); *G01N 2021/258* (2013.01); *G01N 2021/8405* (2013.01)

(58) Field of Classification Search
CPC .... G01N 21/255; G01N 21/90; G01N 21/554; G01N 21/006; C01B 32/182; B82Y 35/00
USPC .................................. 356/432–440, 445–448
See application file for complete search history.

(56) References Cited

U.S. PATENT DOCUMENTS

| | | | | |
|---|---|---|---|---|
| 5,950,487 A | * | 9/1999 | Maresca, Jr. ......... | G01F 23/686 250/577 |
| 2020/0324466 A1 | * | 10/2020 | Nishida ................. | B33Y 30/00 |

FOREIGN PATENT DOCUMENTS

JP 2009058231 A * 3/2009

* cited by examiner

*Primary Examiner* — Hoa Q Pham
(74) *Attorney, Agent, or Firm* — McDonald Hopkins LLC (57) ABSTRACT

A process for sizing two-dimensional nanostructures includes providing the nanostructures to a liquid-liquid interface, providing probe particles to the liquid-liquid interface, obtaining an image of the nanostructures and the probe particles, and processing the image to ascertain a size property of the nanostructures.

17 Claims, 5 Drawing Sheets

PROCESS AND SYSTEM FOR SIZING TWO-DIMENSIONAL NANOSTRUCTURES

CROSS REFERENCE TO RELATED APPLICATIONS

This application claims priority to U.S. Provisional Patent Application Ser. No. 62/859,821 filed on Jun. 11, 2019, the entirety of which is incorporated by reference.

BACKGROUND

The present disclosure relates to processes, systems, and compositions for sizing two-dimensional nanostructures. In particular, methods and systems for characterizing sheets of graphene oxide using optical microscopy in combination with contrasting agents so as to enable in situ imaging of relatively large expanses of single sheets.

Two-dimensional nanostructures are atomically thin materials with properties suitable for a variety of advanced technologies. For example, graphene oxide is a robust material used as a particle surfactant, precursor to graphene, etc. Two dimensional nanostructures have a high aspect ratio (lateral size:thickness). For example, the lateral size may be at least ten times the thickness. Two-dimensional nanostructures include nanosheets which have a relatively small thickness (e.g. 1 nm), and a few nanometers to hundreds of microns in lateral size (e.g. width in multiple directions), depending on methods of synthesis, treatments, or separation techniques.

Graphene oxide size can impact its oxidation potential, solubility and interfacial activity etc. However, current approaches for graphene oxide size measurements are not ideal owing to time constraints and/or costs. For example, dynamic light scattering (DLS) is only suitable for spherical samples; atomic force microscopy (AFM) requires many scans to achieve the area needed; and scanning electron microscopy (SEM) requires expensive operations.

There is a need for new processes for sizing two-dimensional nanostructures that are fast, economical, and amenable to a manufacturing environment. Processes for providing a statistical evaluation of the sample rather than looking at 1 or 2 nanosheets in the sample are also needed.

In view of the immobility, cost, and other operational constraints of existing measurement systems and methods, an apparatus and system for conducting simple, optical microscopy-based measurements would be welcome. A small and portable system would be of particular interest, owing to its ability to be deployed in a large variety of field/manufacturing operations.

SUMMARY OF INVENTION

The processes of the present disclosure generally include capturing an image of a plurality of two-dimensional nanostructures (e.g., nanosheets) and a plurality of probe particles at a liquid-liquid interface. The probe particles create a sufficient contrast with the nanostructures such that subsequent image processing can be used to measure one or more size-related properties of the nanostructures. Accordingly, these particles may also be referred to as contrasting agents.

Disclosed, in some embodiments, is a process for determining a size property of two-dimensional nanostructures. The process includes: providing a first liquid to a transparent container; providing a second liquid to the transparent container, thereby generating a liquid-liquid interface between the first liquid and the second liquid; providing a sample composition to the liquid-liquid interface, the sample composition comprising two-dimensional nanostructures; providing probe particles to the liquid-liquid interface, the probe particles filling interstitial spaces between and creating a contrast with the two-dimensional nanostructures; obtaining an image of the two-dimensional nanostructures and the probe particles; and processing the image to determine the size property.

Also disclosed is another process for determining a size property of two-dimensional nanostructures in a sample, including: providing a sample composition comprising two-dimensional nanostructures to a liquid-liquid interface; providing probe particles to the liquid-liquid interface; capturing an image of the two-dimensional nanostructures and the probe particles at the liquid-liquid interface; and processing the image to determine the size property.

Disclosed, in other embodiments, is a process for capturing a processable image of two-dimensional nanostructures. The process includes providing a sample composition comprising two-dimensional nanostructures to a liquid-liquid interface; providing probe particles to the liquid-liquid interface; and capturing an image of the two-dimensional nanostructures and the probe particles at the liquid-liquid interface. The probe particles fill interstitial spaces between and form a contrast with the two-dimensional nanostructures.

Disclosed, in further embodiments, is a quality control process for determining the quality of two-dimensional nanostructures in a sample. The process includes: providing a sample composition comprising two-dimensional nanostructures to a liquid-liquid interface; providing probe particles to the liquid-liquid interface; capturing an image of the two-dimensional nanostructures and the probe particles at the liquid-liquid interface; processing the image to determine at least one size property; and assigned a quality control grade to the nanostructures based on the at least one size property.

Embodiments comprising systems for sizing two-dimensional nanostructures are also contemplated. Such systems include a biphasic fluid chamber, a port for introducing charged particles, and optical imaging instrumentation coupled to the fluid chamber along an imaging surface. Image processing systems and/or software receives images from the imaging instrumentation, and enables instantaneous characterization of samples disposed along the entire imaging surface. The biphasic chamber is filled with immiscible fluids to create a defined boundary (e.g., oil-water, water-air, and/or oil-air interfaces). The graphene oxide sheets are injected via a port positioned in the biphasic chamber proximate to the immiscible boundary so as to disperse the graphene oxide sheets thereon. Charged particles are provided through the port (or a separate, similarly positioned port) so as to enable high contrast image of the entire imaging surface to be captured by the instrumentation, with the processing system configured to further characterize the size, shape, dimensions, and/or other similar features of the graphene oxide sheets.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Figure 1A:
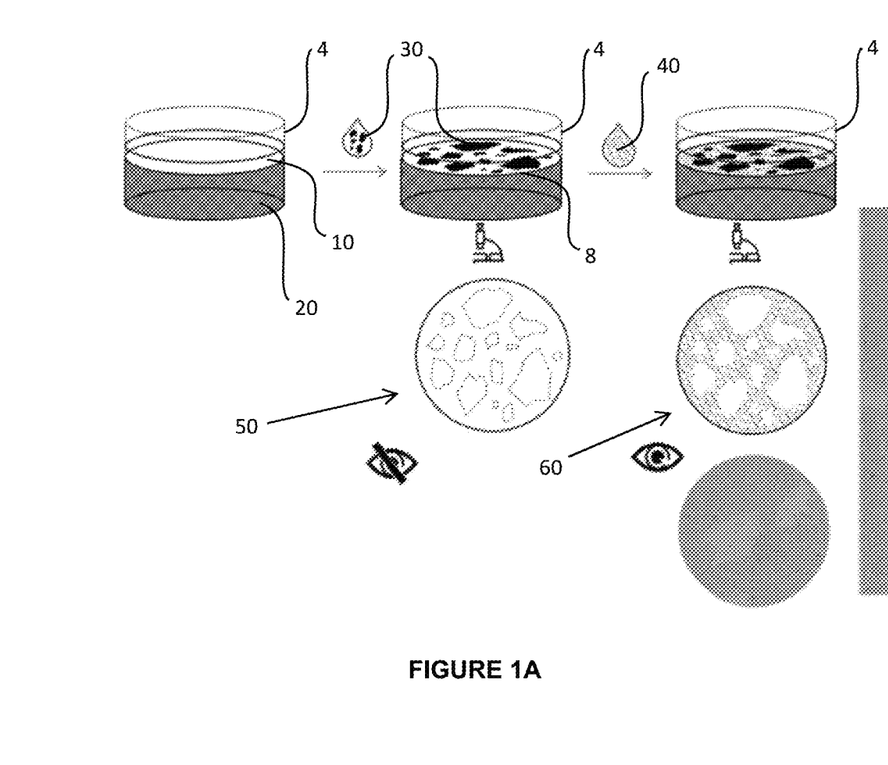
FIG. 1A schematically illustrates a method for obtaining a processable image of a two-dimensional nanostructure in accordance with some embodiments of the present disclosure.

FIG. 1A schematically illustrates a process for obtaining a processable image of two-dimensional nanostructures in accordance with some embodiments of the present disclosure. The nanostructures/nanosheets typically have thicknesses of less than 500 nm (e.g. less than 100 nm) and lateral sizes significantly larger than their thicknesses. It should be understood that the processes, systems, and compositions of the present disclosure are not limited to the particular materials mentioned in FIG. 1A.

Figure 1B:
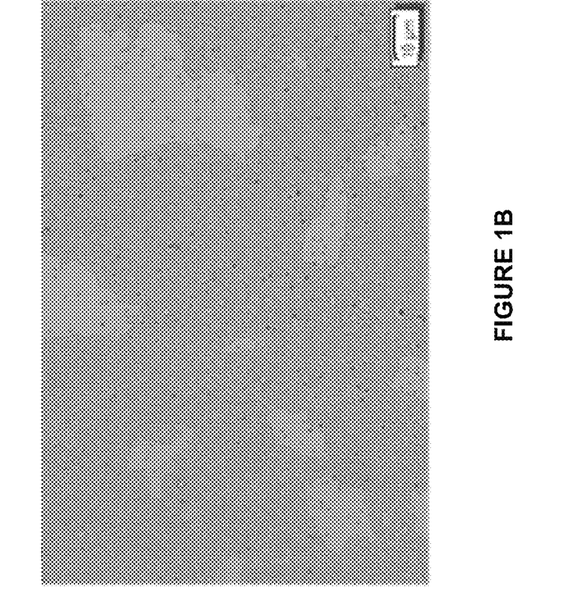
FIG. 1B is an example of an optical microscope image obtained using the method.

First, a small volume of water 10 is added to a dish 4, followed by a small volume of lower density oil 20 (e.g. decane). Such a combination of fluids will remain phase separated to create a discrete interface to which polymers, particles, or other small molecules can be adsorbed. Next, a composition 30 containing a two-dimensional nanostructure (e.g. graphene oxide nanosheets) to be sized is adsorbed directly to the interface 8 (e.g. by taking an aqueous suspension of the nanosheets in a pipette and placing the tip of the pipette at the fluid-fluid interface and injecting the solution slowly, so as not to disrupt the interface). At this point in the protocol graphically illustrated by image 50, the graphene oxide nanosheets are not visible (either by eye or with microscopy) at the water-oil interface because these sheets are only about 1 nm thick. Next, polystyrene probe particles 40 baring a negative bound surface charge are added to the interface in a similar manner to the nanosheets. The size of the probe particles is selected to allow the particles to be imaged and enable high resolution imaging, as graphically illustrated by image 60. For example, if the particles are too small, they do not image well under an optical microscope whereas if the particles are too large the resolution is reduced. Probe particles fill the interstitial spaces, creating contrast that reveals regions covered by probe particles and regions of which appear as blank spaces (see FIG. 1B). Such an arrangement allows for graphene oxide to be imaged with regular transmission microscopy in the widest ever area (e.g. up to 1 mm2), covering a large number of graphene oxide nanosheets to achieve fast and statistically effective size distribution analysis. The upper limit for the area is set by the necessary spatial resolution, which is set by a number of factors associated with the imaging setup. By using a camera with a bigger sensor, changing the necessary spatial resolution, changing the objective, etc., this number could go up or down. Furthermore, images can be taken in an automated way such that many images could be taken in a few seconds and stitched together, making the upper limit of measurement area limited by time and not capability of the system. In some embodiments, the area is of the order of mm2 for a single image capture.

The polystyrene particles may have negatively charged surface chemistry. For example, the polystyrene probe particles may be sulfonated to achieve a negative surface charge. The surface chemistry of the polystyrene particles may allow the particles to be adsorbed to the liquid-liquid interface while preventing undesirable interactions (e.g. flocculation) with graphene oxide (which may carry a negative charge).

Figure 2:
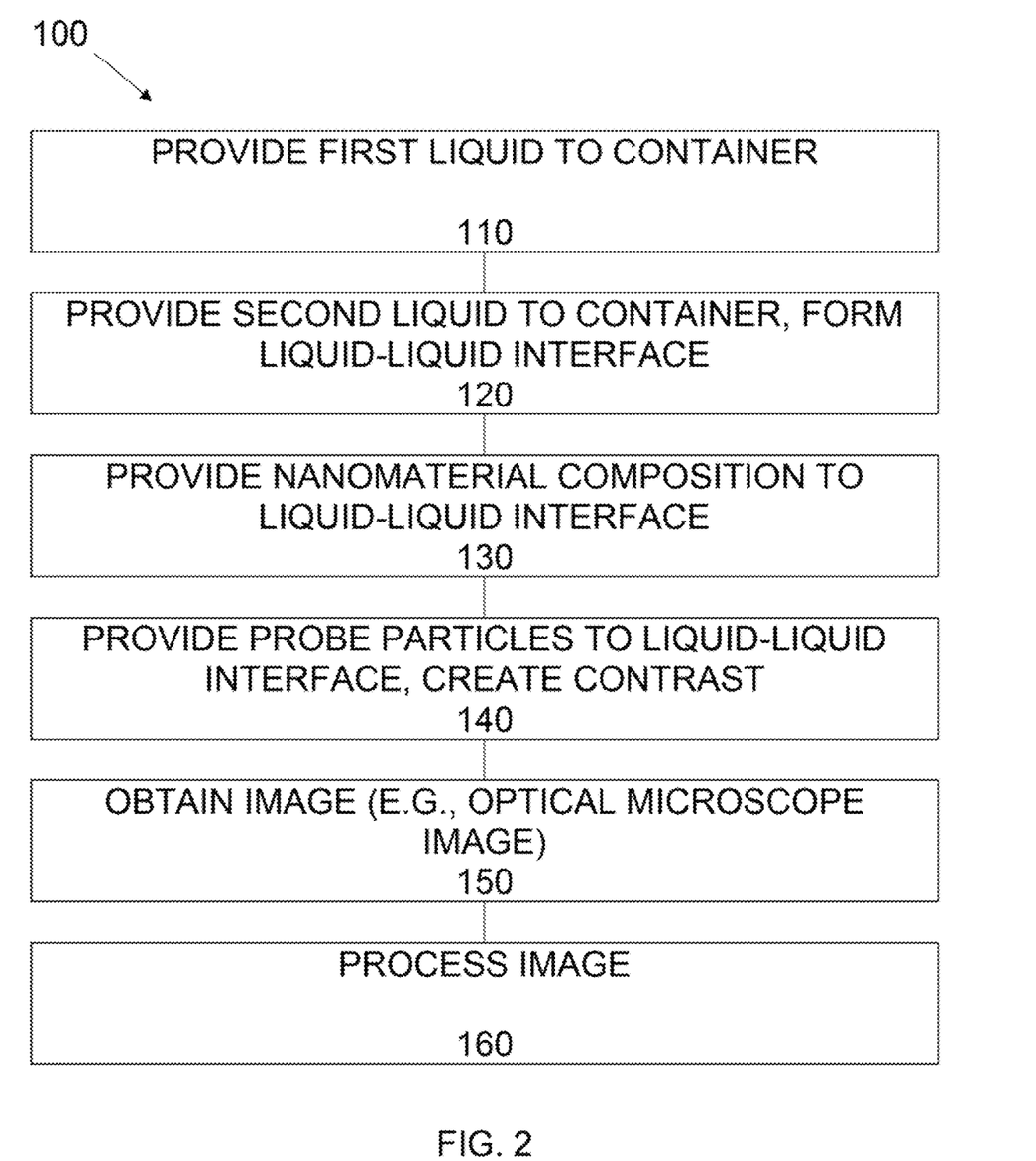
FIG. 2 is a flow chart illustrating a non-limiting embodiment of a method for sizing two-dimensional nanostructures in accordance with some embodiments of the present disclosure.

FIG. 2 is a flow chart illustrating a method for sizing two-dimensional nanostructures 100 in accordance with some embodiments of the present disclosure. The method 100 includes providing a first liquid to a container (e.g. a transparent container) such as a dish 110 and providing a second liquid to the container 120. The first and second liquids are sufficiently different that a liquid-liquid interface separating the liquids is formed. For example, the first liquid and the second liquid may have different densities and/or be immiscible. In some embodiments, one of the first liquid and the second liquid is polar and the other of the first liquid and the second liquid is non-polar. A non-limiting example of a suitable combination is water and an oil. The oil may be an alkane such as decane.

In some embodiments, the first liquid and the second liquid are added to the container separately. In other embodiments, the first and second liquids are added together. However, when the liquids are added at the same time, it may be necessary to wait for phase separation to occur to produce a discrete interface.

A composition containing two-dimensional nanostructures is provided to the liquid-liquid interface 130. The two-dimensional nanostructures can be of various aspect ratios and shapes (rectangular, circular, rhombohedral, hexagonal, irregular, etc.) Non-limiting examples of nanostructure materials include graphene oxide, graphene, single crystal lead sulfur, metal (e.g., palladium, rhodium, gold) nanosheets, transition metal oxide nanosheets, 2D magnets, and metal chalcogenide (e.g. molybdenum sulfide, tungsten sulfide, molybdenum selenide) nanosheets. Hybrid nanosheets are also contemplated. An optical image captured after the introduction of the composition containing two-dimensional nanostructures may not be sufficient for further processing to determine sizing information.

To create a contrast and allow the nanostructures to be properly imaged, probe particles are provided to the liquid-liquid interface 140. In some embodiments, the order of addition of the two-dimensional nanostructures and the probe particles prevents undesirable aggregation.

The probe particles generally have a surface chemistry that allows for adsorption to the liquid-liquid interface while avoiding interactions with the two-dimensional nanostructures. In some embodiments, both the two-dimensional nanostructures and the probe particles carry negative surface charges. In other embodiments, both the two-dimensional nanostructures and the probe particles carry positive surface charges.

The probe particles may be organic or inorganic. Non-limiting examples of probe particles include polymer particles and silica particles. The particles may be treated or modified to achieve a desired surface charge. Positively or negatively charged groups may be added to the polymer particles to yield positive or negative surface charges. Non-limiting examples of groups that the particles may be functionalized with include sulfonate groups, amino groups, hydroxyl groups, carboxyl groups, epoxy groups, dimethyl-amino groups, and thio groups.

In some embodiments, the probe particles are nanoparticles. The particles may have an average diameter in the range of from about 1 nm to about 999 nm, including from about 100 nm to about 900 nm, from 250 nm to about 750 nm, from about 400 nm to about 600 nm, and about 500 nm.

The probe particles may be added until a contrast is observed, and the addition of more probe particles may not change probe particle packing.

After the contrast is created, an image is captured 150. The image may be captured using an optical microscope. In some embodiments, the image is captured using a confocal microscope.

The image may then be processed 160 to determine various sizing parameters of the two-dimensional nanostructures. In non-limiting embodiments, the image captured at 150 may be filtered (e.g. to create a binary image wherein the two-dimensional nanostructures are represented by a first color (e.g. black) and the probe particles are represented by a second color (e.g. white)). The size of the two-dimensional nanosheets can then be inferred from the regions of the first color. Imaging algorithms may be used to measure one or more size properties of each two-dimensional nanosheets individually and/or averages, medians, distributions of a plurality or all of the nanosheets. Non-limiting examples of sizing properties include maximum dimension, sieve diameter, Martin's diameter, Feret's diameter, projected area diameter, and surface area; and averages, medians, distributions, etc. thereof.

The imaging and image processing may be performed at the same or different locations. For example, the imaging may take place in a laboratory or a production facility and the image may be sent off-site for image processing or processed on-site.

The methods, systems, and compositions of the present disclosure may be used for quality control purposes. In some embodiments, after the measurement/calculation of one or more size properties of nanostructures in a sample, the one or more size properties are compared to quality control guidelines and the sample is assigned a quality grade. In some embodiments, the quality control guidelines only include two grades (i.e. pass and fail). However, in other embodiments, there may be more than two grades (e.g. high quality, acceptable quality, low quality). In some embodiments, the quality control processes involve testing a plurality of samples and sorting the samples into different groups based on their quality control grades.

Figure 5:
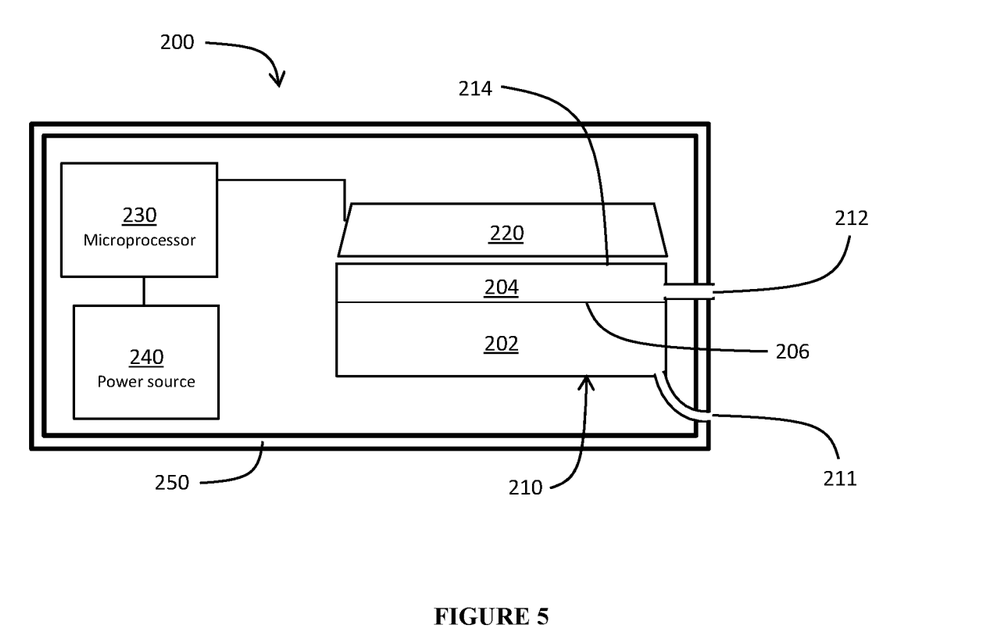
FIG. 5 is a schematic representation of a system according to certain aspects of the invention.

A system 200 for executing any and all of these various method is also contemplated, as is schematically shown in FIG. 5. The reagents, processes, and other details disclosed herein further inform certain aspects of these systems. At their most fundamental level, system 200 comprises a biphasic fluid holding chamber 210. Immiscible fluids 202, 204, such as water and decane, are provided in the chamber 210 for the purposes described above. Fluids 202, 204 create a boundary 206 along with the methods and processes above occur. A flush port 211 allows evacuation and cleaning of the chamber 210, although fluids expelled from the system 200 should be properly disposed of.

At least one injection port 212 is provided in the chamber 210 for introduction of samples to be characterized and/or contrasting reagents used to facilitate the image processing techniques. A plurality of ports 212 may be provided, with each positioned to coincide with the boundary or planar surface where the immiscible boundary between the fluids in chamber 210 is formed.

An imaging surface 214 is formed along a facing of the chamber 210. The surface 214 is transparent, translucent, or otherwise constructed to permit an optical imaging instrument 220, such as an optical microscope or an array of such microscopes, to instantaneously capture images along the entirety of the surface 214. In this manner, it is not necessary to "stitch" together smaller images, as might be required by the use of scanning electron or atomic force microscopy. Further, owing to their relative ubiquity, cost, and ease of manufacture, optical microscopy allows for a compact and portable system 200 to be constructed.

A programmable or dedicated microprocessor 230 receives images from the instrument 220. Appropriate software enables microprocessor 230 to output images or data representative of the characteristics of the graphene oxide samples/sheets. A power source 240, such as an A/C power supply or a conventional battery, is coupled to all elements requiring electricity. The use of consumer disposable batteries ensures a system 200 that can be compact and highly portable.

The foregoing components may be arranged and confined with a durable housing 250. Housing 250 may be integrally formed to define the chamber 210 and/or ports 211, 212. Cavities, electrical connections, and flow passages may be also provided via injection molding or use of discrete structural members so as to receive instrument 220, microprocessor 230, and/or power source 240. A plurality of chambers 210 could be provided in a rotary or sliding assembly so as to enable simultaneous imaging, loading, and explusion/cleaning of chambers so as to improve throughput of the system 200. Still further modifications to the system 200 may be employed to achieve these and other ends.

The methods, systems, and compositions of the present disclosure allow for the the high-throughput sizing of two-dimensional nanostructures. The sizing methods are cost-effective and amenable to a manufacturing environment. The methods are valuable to a wide variety of industrial sections, including but not limited to advanced materials, coatings, and the electronics industries.

The following examples are provided to illustrate the devices and methods of the present disclosure. The examples are merely illustrative and are not intended to limit the disclosure to the materials, conditions, or process parameters set forth therein.

EXAMPLES

Figure 3A:
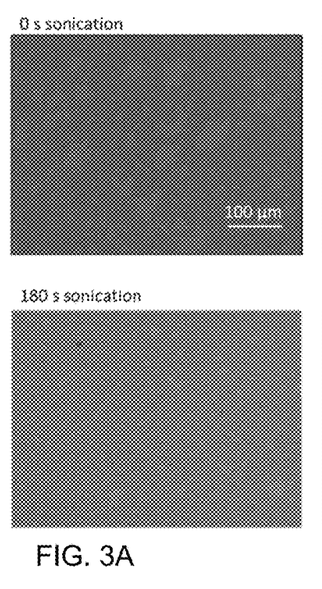
FIG. 3A is an original microscope image as described in the Examples.
Figure 3B:
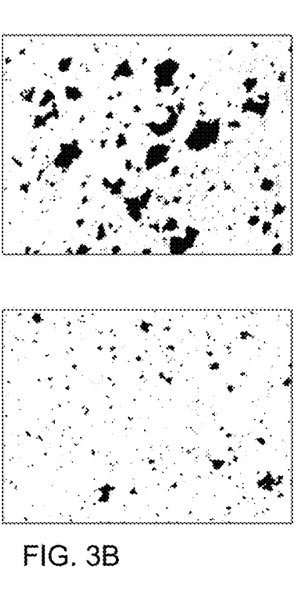
FIG. 3B is a filtered, binary image obtained by processing the image of FIG. 3A.
Figure 3C:
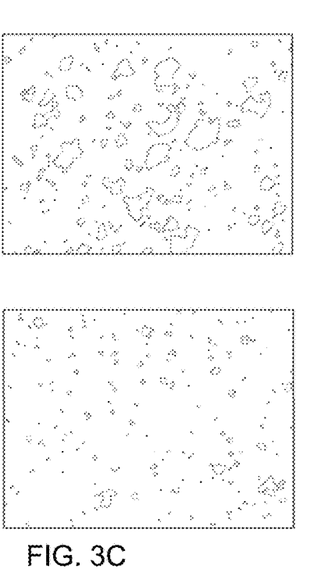
FIG. 3C is a further processed image used to measure the projected area of each nanosheet.

The method depicted in FIG. 1A was used to prepare a composition capable of being imaged for sizing purposes. FIG. 3A is an optical microscope image captured with a regular upright microscope at ambient conditions without special hardware or optics modifications. Such an arrangement is amenable to a manufacturing environment in which quality control measurements may be conducted. The images are then processed such that blank regions found in the raw micrograph (see FIG. 3A) are made solid black while all other regions made white (see FIG. 3B). Finally, 'off-the-shelf' imaging algorithms executed from a piece of free software, ImageJ, are used to measure the projected area of each graphene sheet (see FIG. 3C). The size of each graphene oxide nanosheet can be inferred from the black regions.

The projected area of graphene oxide nanosheets was measured for two samples prepared in different ways. The first sample ('Large GO') consists of graphene oxide nanosheets that have not been processed to decrease the average size of sheets. The second sample ('Small GO') was sonicated to reduce the average size of sheets. Comparison of these samples allows for benchmarking this technique for (i) detecting changes in size and (ii) against the state of the art technology for measuring graphene oxide nanosheets size, SEM.

Figure 4A:
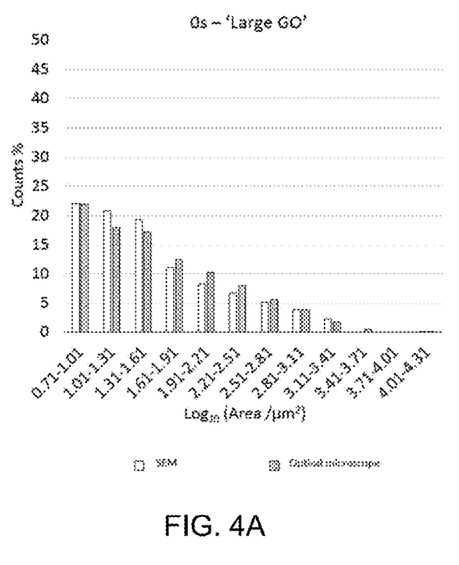
FIG. 4A is a graph illustrating the similarity between the area measurements using an optical microscope in accordance with some embodiments of the present disclosure compared to method using a SEM as described in the Examples for larger nanosheets.
Figure 4B:
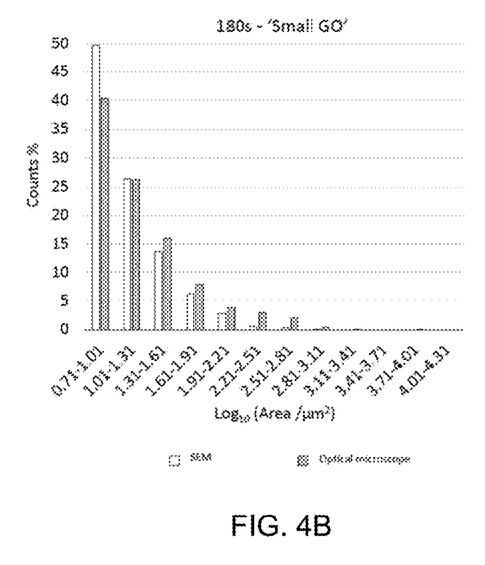
FIG. 4B is a graph illustrating the similarity between the area measurements using an optical microscope in accordance with some embodiments of the present disclosure compared to method using a SEM as described in the Examples for smaller nanosheets.

FIG. 4A summarizes these data. First, detection of changes in size was successful with the technique described herein, namely the 'optical microscope' technique. The distribution of projected area for 'Large GO' nanosheets was large (shifted right in FIG. 4A) compared to the distribution of project area for 'Small GO' (see FIG. 4B). Further, measurements obtained from the optical microscope technique were in strong quantitative agreement with that of the SEM measurements. However, SEM measurements require significant resources of time (measurement takes much longer) and money (SEM instrument is far more expensive). Furthermore, the optical microscope technique can be utilized in a manufacturing environment at ambient pressures, while SEM needs to be conducted in a vacuum, which is typically not amenable to a manufacturing environment.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the system and apparatus disclosed herein may be performed by more, fewer, or other components and the methods described herein may include more, fewer or other steps. Additionally, steps may be performed in any suitable order.

We claim:

1. A system for sizing two-dimensional nanostructures, the system comprising:
a housing including: i) at least one biphasic fluid chamber containing a first liquid and a second liquid that is immiscible with the first liquid so as to create an imaging surface and at least one port configured to receive a nanostructure material which is adsorbed along the imaging surface and, separately, probe particles introduced to interstitial spaces of the nanostructure material, thereby creating a contrasted sample;
an optical imaging instrument configured to capture an image of contrasted sample along substantially all of the imaging surface; and
a microprocessor configured to i) generate a binary image of the contrasted sample with separate colors associated with the nanostructure material and the charged particles and ii) calculate a size property associated with the nanostructure material.

2. The system according to claim 1 wherein a plurality of ports are formed, at least one port dedicated for injection of a sample and/or receipt of the probe particles.

3. The system according to claim 1 wherein a plurality of ports are formed, at least one port dedicated for expulsion of fluids from the chamber.

4. The system according to claim 1 further comprising a portable and replaceable power source contained within the housing and wherein the optical imaging instrument is an optical microscope.

5. The system according to claim 1 wherein the first fluid is an aqueous based solution and the second fluid is an alkane.

6. The system of claim 1, wherein the first liquid and the second liquid have different densities.

7. A process for determining a size property of two-dimensional nanostructures in a sample, the process comprising:
   providing a sample composition comprising two-dimensional nanostructures to a liquid- liquid interface;
   providing probe particles to the liquid-liquid interface;
   capturing an image of the two-dimensional nanostructures and the probe particles at the liquid-liquid interface;
   processing the image by filtering the image to create a binary image wherein the two- dimensional nanostructures are represented by a first color and the probe particles are represented by a different color and executing an algorithm on the binary image to determine the size property.

8. The process of claim 7, wherein the image is captured using an optical microscope.

9. The process of claim 7, wherein the two-dimensional nanostructures are graphene oxide nanosheets.

10. The process of claim 7, wherein the probe particles comprise charged polystyrene particles.

11. The process of claims 7, wherein the probe particles are nanoparticles.

12. The process of claim 7, further comprising:
    creating the liquid-liquid interface between a first liquid and a second liquid prior to the provision of the two-dimensional nanostructures and the probe particles.

13. The process of claim 12, wherein the first liquid and the second liquid are immiscible and have different densities.

14. The process of claim 12, wherein the first liquid is water and the second liquid is an oil.

15. The process of claim 12, wherein the second liquid is an alkane.

16. The process of claims 12, wherein the second liquid is decane.

17. The process of claim 12, wherein the algorithm is executed using a computer processor.

* * * * *